US009246217B2

(12) United States Patent
Yang et al.

(10) Patent No.: US 9,246,217 B2
(45) Date of Patent: *Jan. 26, 2016

(54) ADJUSTING MECHANISM AND RELATED ANTENNA SYSTEM

(71) Applicant: Wistron NeWeb Corporation, Hsinchu (TW)

(72) Inventors: Lan-Chun Yang, Hsinchu (TW); Ming-Chan Lee, Hsinchu (TW); Hung-Yuan Lin, Hsinchu (TW); San-Yi Kuo, Hsinchu (TW); Wei-Te Chien, Hsinchu (TW)

(73) Assignee: Wistron NeWeb Corporation, Hsinchu Science Park, Hsinchu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 14/311,343

(22) Filed: Jun. 22, 2014

(65) Prior Publication Data
US 2014/0306072 A1  Oct. 16, 2014

Related U.S. Application Data

(63) Continuation-in-part of application No. 13/221,918, filed on Aug. 31, 2011, now Pat. No. 8,797,228.

(30) Foreign Application Priority Data

Jun. 28, 2011 (TW) .............................. 100122608 A

(51) Int. Cl.
| *A47B 96/06* | (2006.01) |
| *H01Q 3/08* | (2006.01) |
| *F16M 11/12* | (2006.01) |
| *H01Q 1/12* | (2006.01) |
| *H01Q 3/06* | (2006.01) |

(52) U.S. Cl.
CPC ................. *H01Q 3/08* (2013.01); *F16M 11/12* (2013.01); *H01Q 1/12* (2013.01); *H01Q 1/125* (2013.01); *H01Q 1/1228* (2013.01); *H01Q 3/06* (2013.01)

(58) Field of Classification Search
CPC ......... H01Q 3/08; H01Q 1/12; H01Q 1/1228; H01Q 3/06; H01Q 1/125
USPC ................ 343/880, 881, 882, 878; 248/218.4
See application file for complete search history.

(56) References Cited

U.S. PATENT DOCUMENTS

| 8,794,578 | B2 * | 8/2014 | Lin et al. .................... 248/218.4 |
| 8,797,228 | B2 * | 8/2014 | Yang et al. ..................... 343/882 |
| 2001/0046258 | A1 | 11/2001 | Wise |
| 2005/0264467 | A1 * | 12/2005 | Lin et al. ........................ 343/882 |
| 2006/0181477 | A1 * | 8/2006 | Lin et al. ........................ 343/880 |
| 2007/0177064 | A1 * | 8/2007 | Lin et al. ........................ 348/838 |
| 2009/0050863 | A1 | 2/2009 | Conway |
| 2009/0061761 | A1 * | 3/2009 | Yang et al. ................... 455/3.02 |
| 2013/0002518 | A1 * | 1/2013 | Yang et al. ..................... 343/882 |

* cited by examiner

*Primary Examiner* — Gwendolyn Baxter
(74) *Attorney, Agent, or Firm* — Winston Hsu; Scott Margo

(57) ABSTRACT

An adjusting mechanism includes a base, a supporter, a connecting component and a jointing component. A slide slot is formed on the base. The supporter is pivotally connected to the base via a shaft. The connecting component is rotatably and slidably disposed on the slide slot on the base. A curved slot is formed on the connecting component. The jointing component is disposed on the supporter and slidably inserts to the curved slot on the connecting component. The connecting component slides relative to the supporter via the jointing component along a direction of the curved slot to simultaneously rotate the supporter relative to the base.

14 Claims, 11 Drawing Sheets

ADJUSTING MECHANISM AND RELATED ANTENNA SYSTEM

CROSS REFERENCE TO RELATED APPLICATIONS

This application is a continuation in part of U.S. application Ser. No. 13/221,918, filed 2011 Aug. 31.

BACKGROUND OF THE INVENTION

1. Field of the Invention

The present invention relates to an adjusting mechanism, and more particularly, to an adjusting mechanism for linearly adjusting an angle of an antenna module and a related antenna system.

2. Description of the Prior Art

For receiving signals generated by a satellite effectively, an antenna module includes an adjusting mechanism for adjusting rotary angle of the antenna module according to a position of the satellite relative to the ground. A conventional adjusting mechanism for adjusting an elevation and an azimuth of the antenna module relative to the satellite includes a sheath and a rotating structure. The sheath sheathes on a supporting tube, and the rotating structure is disposed on an end of the sheath (for example, the rotating structure is disposed on top of the sheath), so that the conventional adjusting mechanism can adjust the elevation and the azimuth of the antenna module relative to the supporting tube and the satellite. The conventional adjusting mechanism includes a screw rod and a screw having a side hole. The screw having the side hole is disposed on an end of the screw rod and fixed on the rotating structure. A forcing portion of the screw rod is fixed on the sheath. The forcing portion is applied for rotating the screw rod, so that the screw having the side hole moves relative to thread on the screw rod for adjusting an angle between the rotating structure and the sheath. However, the conventional adjusting mechanism has drawbacks of expensive cost and inconvenient operation due to huge volume. In addition, the rotating structure non-linearly moves relative to the sheath due to the movement between the screw rod and the screw having the side hole. Thus, design of an adjusting mechanism with linear movement mode and having advantages of simple structure, low manufacturing cost and low transportation cost for determining an elevation angle and an azimuth angle of the antenna module is an important issue of the antenna industry.

SUMMARY OF THE INVENTION

The present invention provides an adjusting mechanism for linearly adjusting an angle of an antenna module and a related antenna system for solving above drawbacks.

According to the claimed invention, an adjusting mechanism includes a base, a supporter, a connecting component and a jointing component. A slide slot is formed on the base. The supporter is pivotally connected to the base via a shaft. The connecting component is rotatably and slidably disposed on the slide slot on the base. A curved slot is formed on the connecting component. The jointing component is disposed on the supporter and slidably inserts to the curved slot on the connecting component. The connecting component slides relative to the supporter via the jointing component along a direction of the curved slot to simultaneously rotate the supporter relative to the base.

According to the claimed invention, an antenna system includes an antenna module, a tube and an adjusting mechanism. The adjusting mechanism is disposed between the antenna module and the tube. The adjusting mechanism includes a base, a supporter, a connecting component and a jointing component. A slide slot is formed on the base. The supporter is pivotally connected to the base via a shaft. The connecting component is rotatably and slidably disposed on the slide slot on the base. A curved slot is formed on the connecting component. The jointing component is disposed on the supporter and slidably inserts to the curved slot on the connecting component. The connecting component slides relative to the supporter via the jointing component along a direction of the curved slot to simultaneously rotate the supporter relative to the base.

The antenna system of the present invention can utilize the adjusting mechanism to execute angle adjustment of the antenna module relative to the tube, such as the elevation angle or the azimuth angle, and it depends on position of the adjusting mechanism. The adjusting mechanism of the present invention can adjust the angle of the supporter relative to the base by sliding the connecting component relative to the jointing component. Because the first slot on the connecting component can be the linear arc slot, pivot of the supporter relative to the base can be the linear rotation, so that the elevation angle (or the azimuth angle) of the antenna module can be adjusted accurately. In addition, the adjusting mechanism of the present invention has advantages of simple structure, easy operation and low transportation cost.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
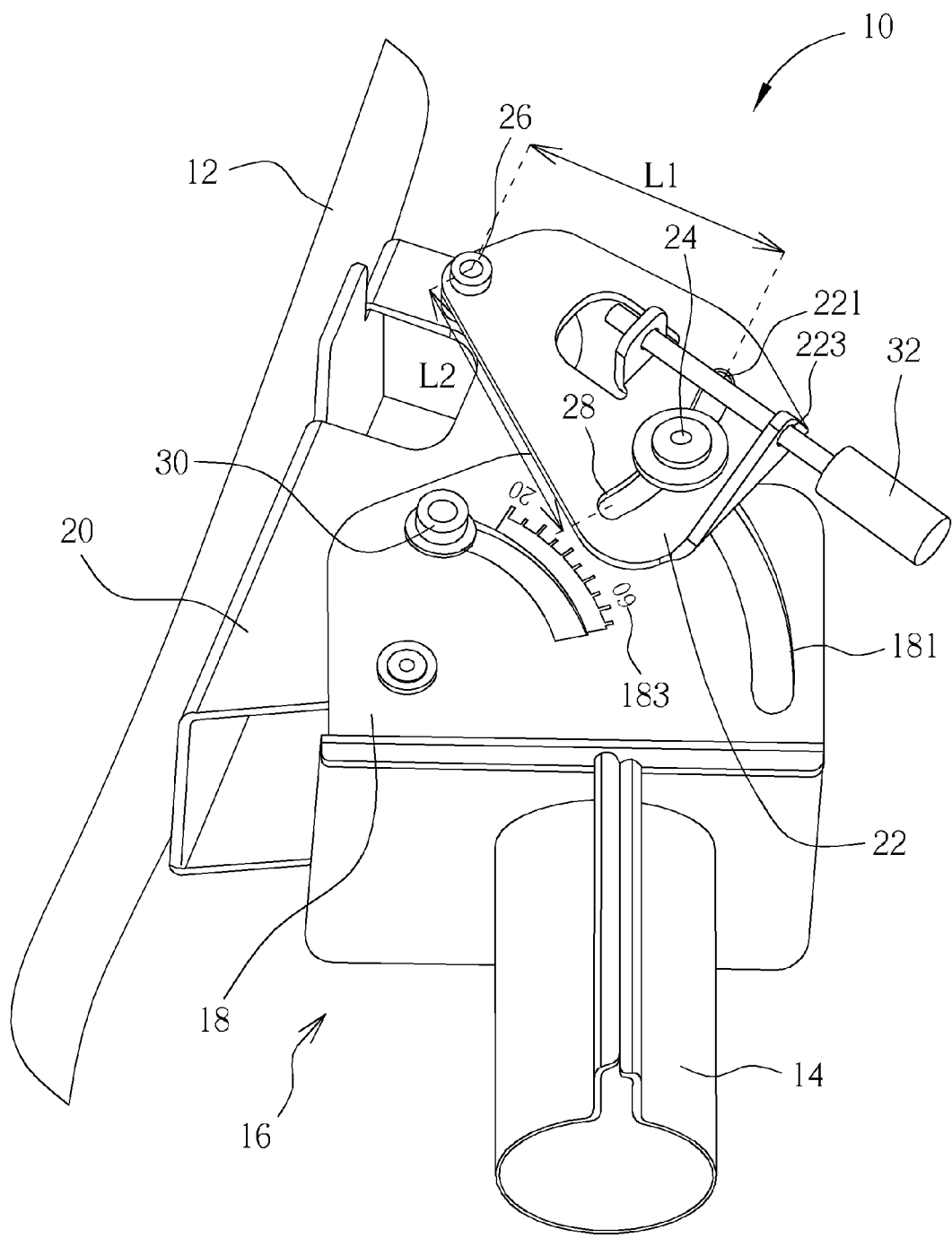
FIG. 1 is a diagram of an antenna system according to a first embodiment of the present invention.
Figure 2:
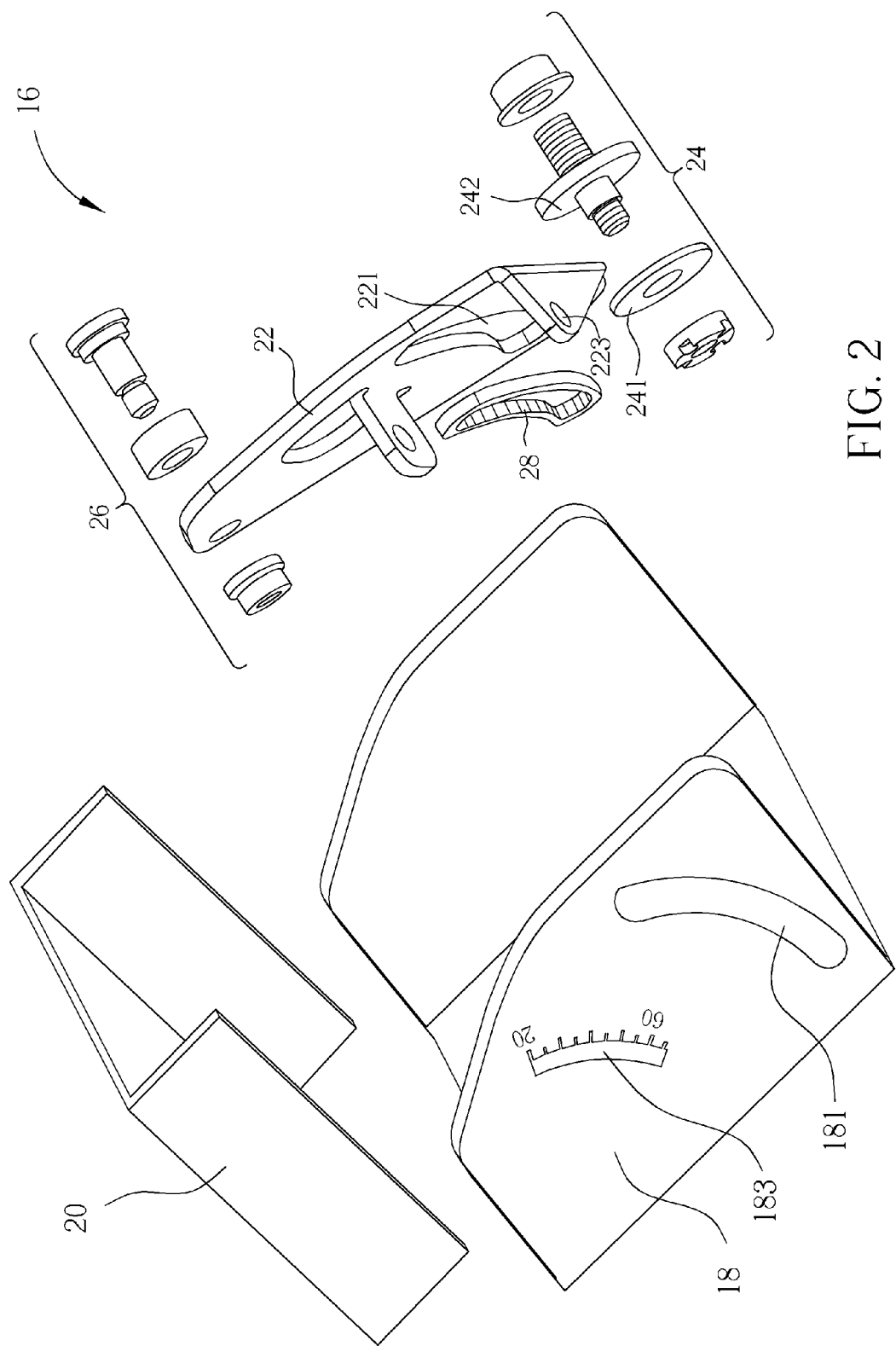
FIG. 2 is an exploded diagram of an adjusting mechanism according to the first embodiment of the present invention.

Please refer to FIG.1. FIG.1 is a diagram of an antenna system 10 according to a first embodiment of the present invention. The antenna system 10 includes an antenna module 12, a tube 14 and an adjusting mechanism 16. Please refer to FIG.2. FIG.2 is an exploded diagram of the adjusting mechanism 16 according to the first embodiment of the present invention. The antenna module 12 can be installed on the tube 14 via the adjusting mechanism 16, and an angle of the antenna module 12 relative to the tube 14, such as an elevation angle and an azimuth angle, can be adjusted by the adjusting mechanism 16. In the first embodiment, the adjusting mechanism 16 is for adjusting the elevation angle of the antenna module 12. As shown in FIG.1 and FIG.2, the adjusting mechanism 16 includes a base 18 installed on the tube 14, a supporter 20 pivoting to the base 18 for supporter the antenna module 12, and a connecting component 22 pivoting to the supporter 20. A first slot 221 is formed on the connecting component 22. The adjusting mechanism 16 further includes a jointing component 24 disposed on the base 18 and slidably inserting into the first slot 221 on the connecting component 22 for simultaneously pivoting relative to the supporter 20 and sliding relative to the jointing component 24 along a direction of the first slot 221, so as to adjust the elevation angle of the supporter 20 relative to the base 18. The jointing component 24 includes a spacer 241 and a rotary shaft 242. When the jointing component 24 inserts into the first slot 221 and the rotary shaft 242 is used to be a revolution axis, the spacer 242 can be disposed on a lateral surface of the connecting component 22 for protection and friction-proofing. In addition, thread structures can be formed on two ends of the rotary shaft 242, and the nuts can be locked on the thread structures, so the jointing component 24 can be disposed between the base 18 and the connecting component 22, and can slide relative to a second slot 181 or the first slot 221 according to the angle adjustment.

In addition, the adjusting mechanism 16 can further include a rotary set 26. The connecting component 22 can pivot to the supporter 20 via the rotary set 26, and a distance can be formed between the rotary set 26 and each section of the first slot 221 on the connecting component 22, which means that the connecting component 22 can be a polygonal component, and the rotary set and the first slot 221 are respectively formed on different sides of the polygonal component. A shape of the first slot 221 corresponds to an angle adjusting function of the supporter 20 relative to the base 18. For example, the first slot 221 can be an S-shaped slot, and meanwhile, the angle variation function of the supporter 20 relative to the base 18 can be a sine wave function. In the first embodiment of the present invention, the first slot 221 can be an arc slot, as shown in FIG. 1 and FIG. 2, a distance L1 between the rotary set 26 and an end of the first slot 221 is substantially smaller than a distance L2 between the rotary set 26 and the other end of the first slot 221, and the distance between the rotary set 26 and a section between two ends of the first slot 221 is different from the distance of the rotary set 26 and the other section of the first slot 221. That is to say, the first slot 221 can be a linear arc slot, and a scalene triangle can be formed by two ends of the linear arc slot and a position point of the rotary set 26. Because the jointing component 24 slides along the linear arc slot, angle variation of the supporter 20 relative to the base 18 can be a linear variation. A dial scale 183 can be formed on a surface of the base 18 for helping an operator to adjust and determine the angle of the supporter 20 relative to the base 18. Material of the base 18, the supporter 20 and the connecting component 22 are not limited to metal material or plastic material, and depend on design demand.

Figure 3:
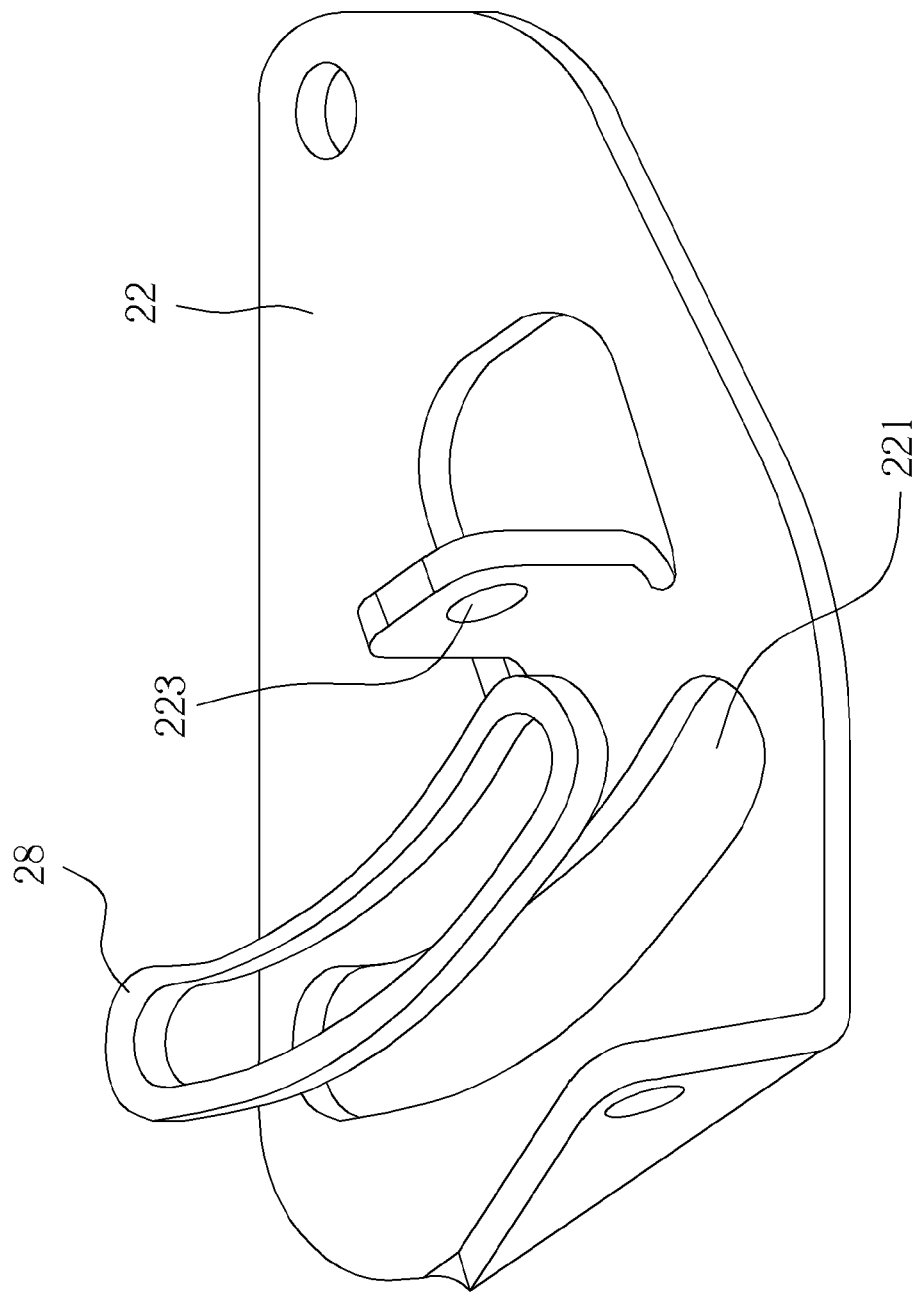
FIG. 3 to FIG. 5 are diagrams of a constraining component according to different embodiments of the present invention.
Figure 4:
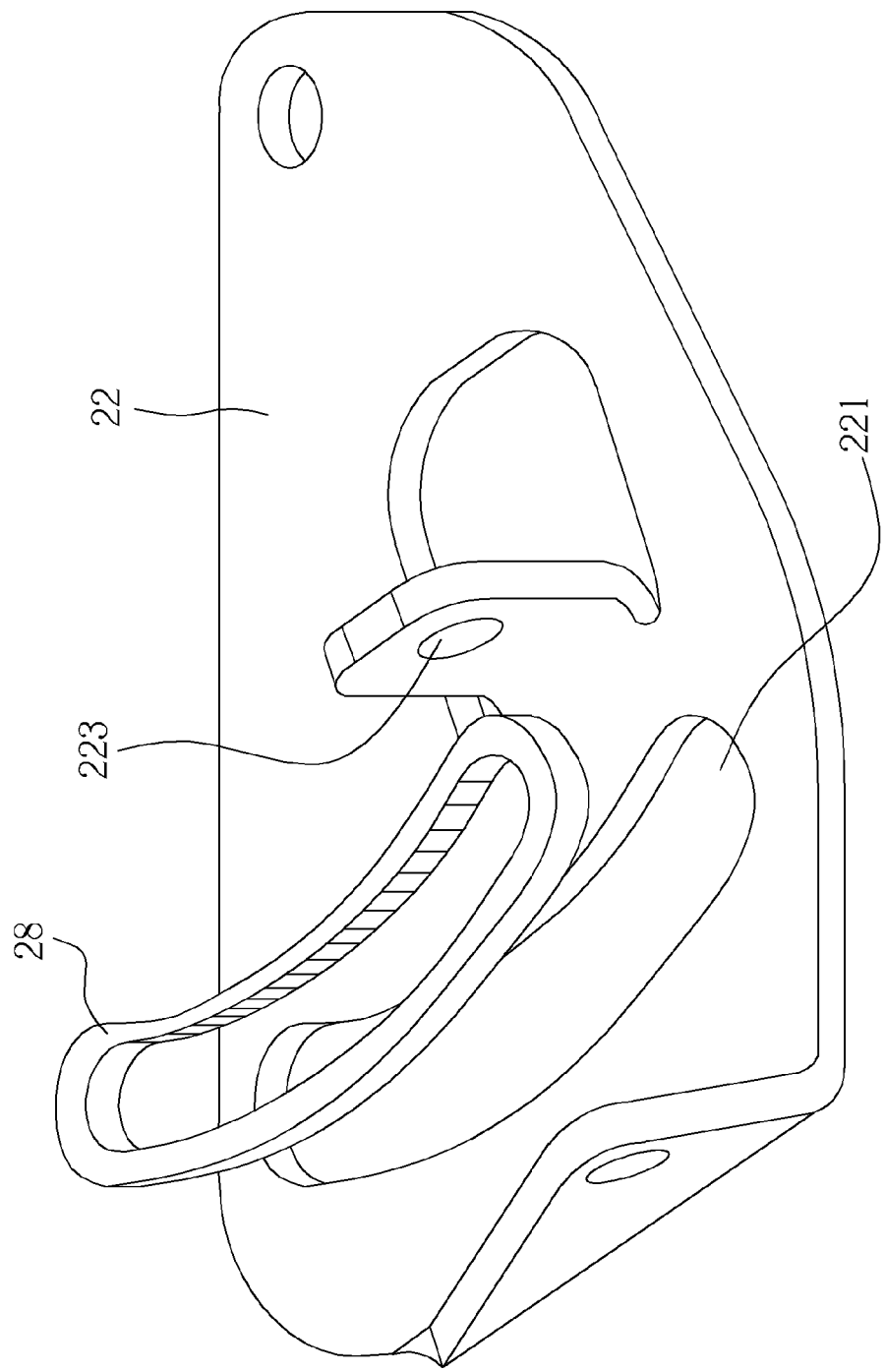
Figure 5:
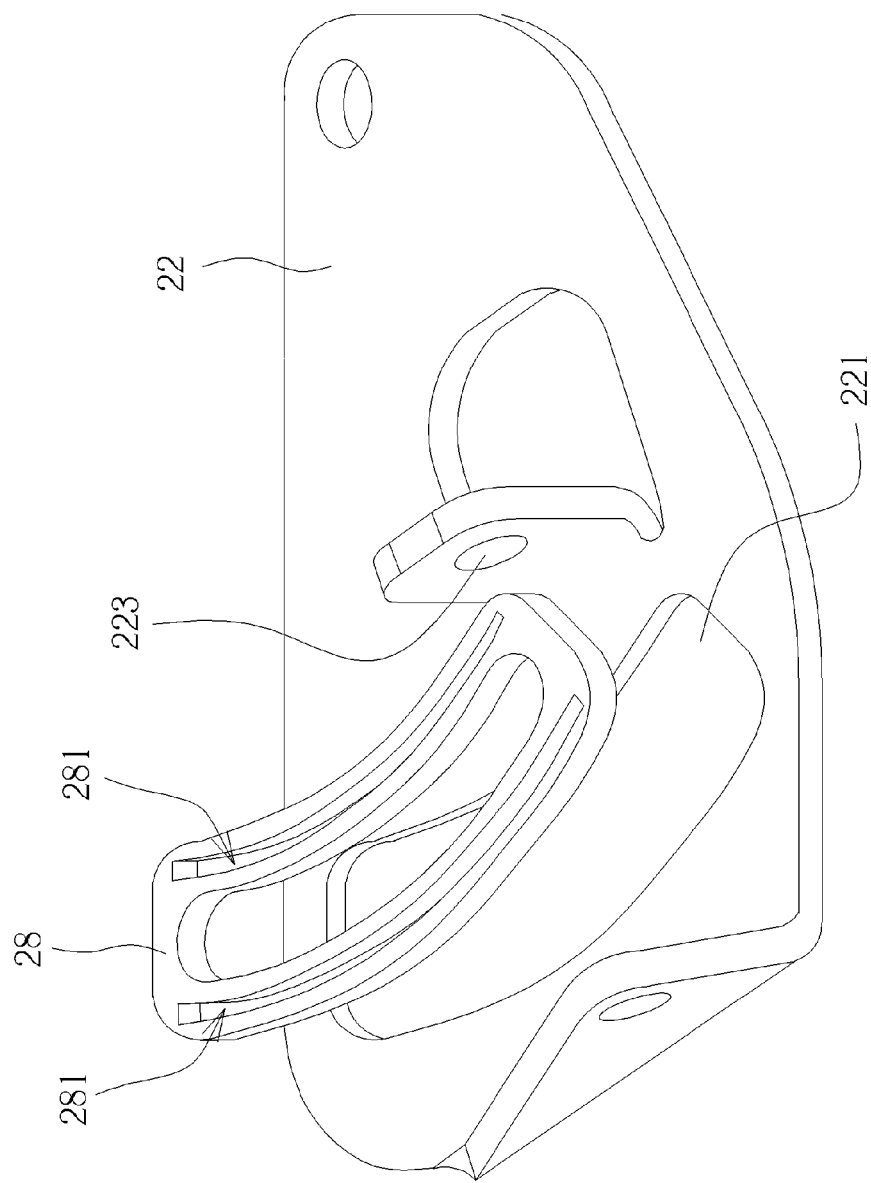

Furthermore, the adjusting mechanism 16 can further include a constraining component 28 disposed inside the first slot 221 on the connecting component 22 for preventing the jointing component 24 from sliding relative to the first slot 221, so as to fix the angle of the supporter 20 relative to the base 18. Please refer to FIG. 3 to FIG. 5. FIG. 3 to FIG. 5 are diagrams of the constraining component 28 according to different embodiments of the present invention. As shown in FIG. 3, a smooth internal surface can be formed on the constraining component 28, and the constraining component 28 can be made of deformable material, such as rubber. The jointing component 24 can be covered by the constraining component 28 and be disposed inside the first slot 221, so that the jointing component 24 can slide relative to the first slot 221 in stepless regulation due to resilient deformation of the constraining component 28, such as the embodiment shown in FIG. 3. As shown in FIG. 4, a serrate internal surface can further be formed on the constraining component 28, and the jointing component 24 can be clamped by the constraining component 28 for sliding relative to the first slot 221. Because the constraining component 28 does not slide relative to the first slot 221, a one-sided serrate internal surface can be formed on the constraining component 28 generally, so that the jointing component 24 can move relative to the first slot 221 in step regulation. The constraining component 28 can be made of aluminum material for increasing strength. As shown in FIG. 5, two third slots 281 can be formed on two sides of the constraining component 28 for absorbing resilient deformation generated when the constraining component 28 is compressed. As the three embodiments shown in FIG. 3 to FIG. 5, the constraining component 28 can be for clamping the jointing component 24 by a resiliently deformable manner. The thread structure, shapes and material of the constraining component 28 are not limited to the above-mentioned embodiment, and depend on design demand.

As shown in FIG. 1 and FIG. 2, the adjusting mechanism 16 can further include a fixing component 30 piercing through the base 18 and the supporter 20 for preventing the supporter 20 from pivoting relative to the base 18 when the antenna module 12 is rotated at a predetermined angle. It should be mentioned that a fine (micro-scale) adjustment of the antenna system 10 can be executed by sliding the connecting component 22 relative to the jointing component 24, so as to adjust the angle of the supporter 20 relative to the base 18. A second slot 181 can be formed on the base 18 of the antenna system 10, and the jointing component 24 can slidably insert into the first slot 221 and the second slot 181 simultaneously. When the jointing component 24 slides inside the second slot 181, the connecting component 22 can be driven to pivot the supporter 20 relative to the base 18 in macro-scale adjustment. Then, the fixing component 30 is for fixing the supporter 20 on the base 18 after the micro-scale adjustment and the macro-scale adjustment are executed. The adjusting mechanism 16 can further include a contacting component 32 detachably inserting into an opening 223 on the connecting component 22. The contacting component 32 can be pushed for pivoting the connecting component 22 relative to the supporter 20, and sliding the connecting component 22 relative to the jointing component 24 along the direction of the first slot 221.

Figure 6:
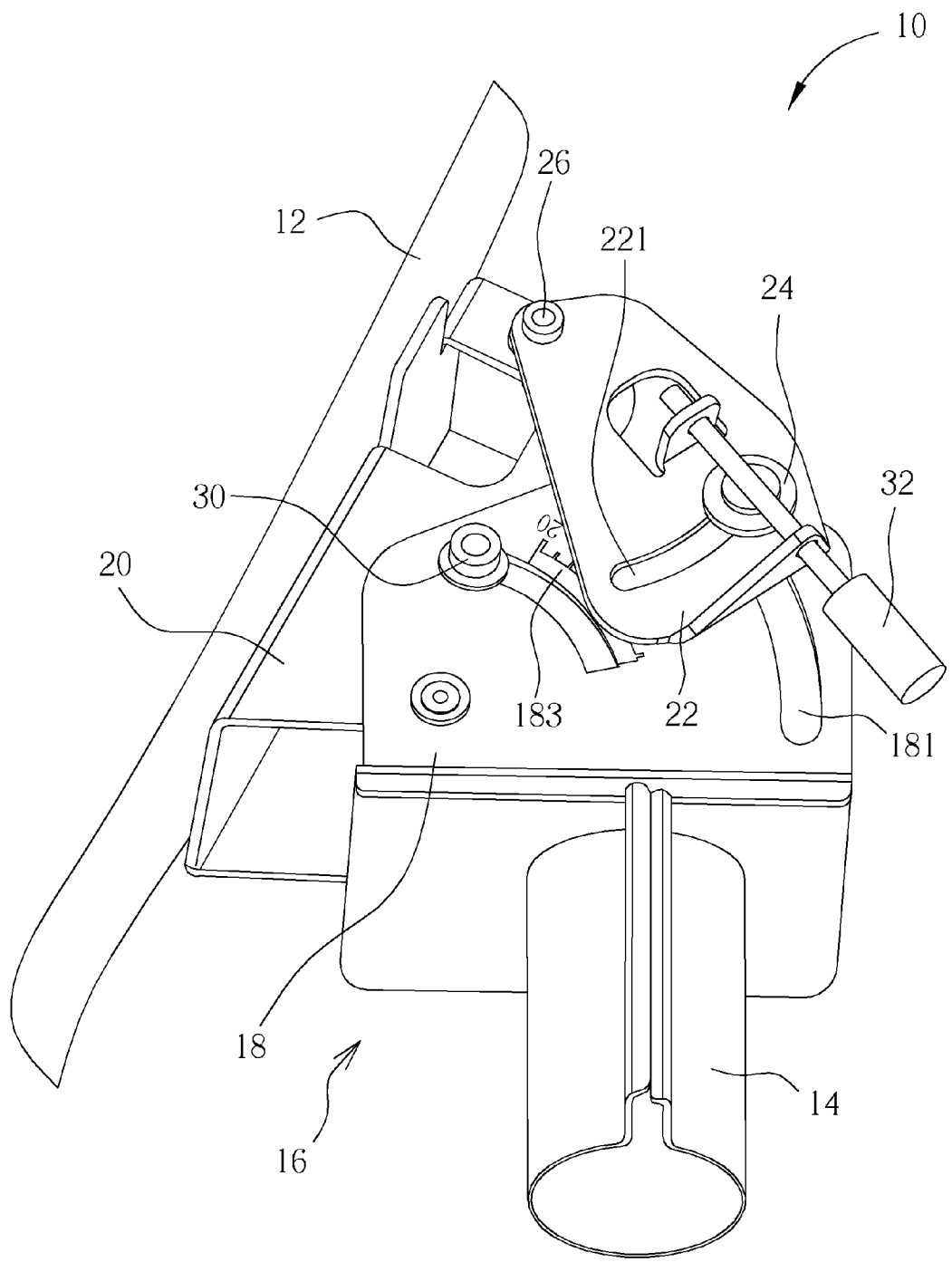
FIG. 6 and FIG. 7 are diagrams of the antenna system in different modes according to the first embodiment of the present invention.
Figure 7:
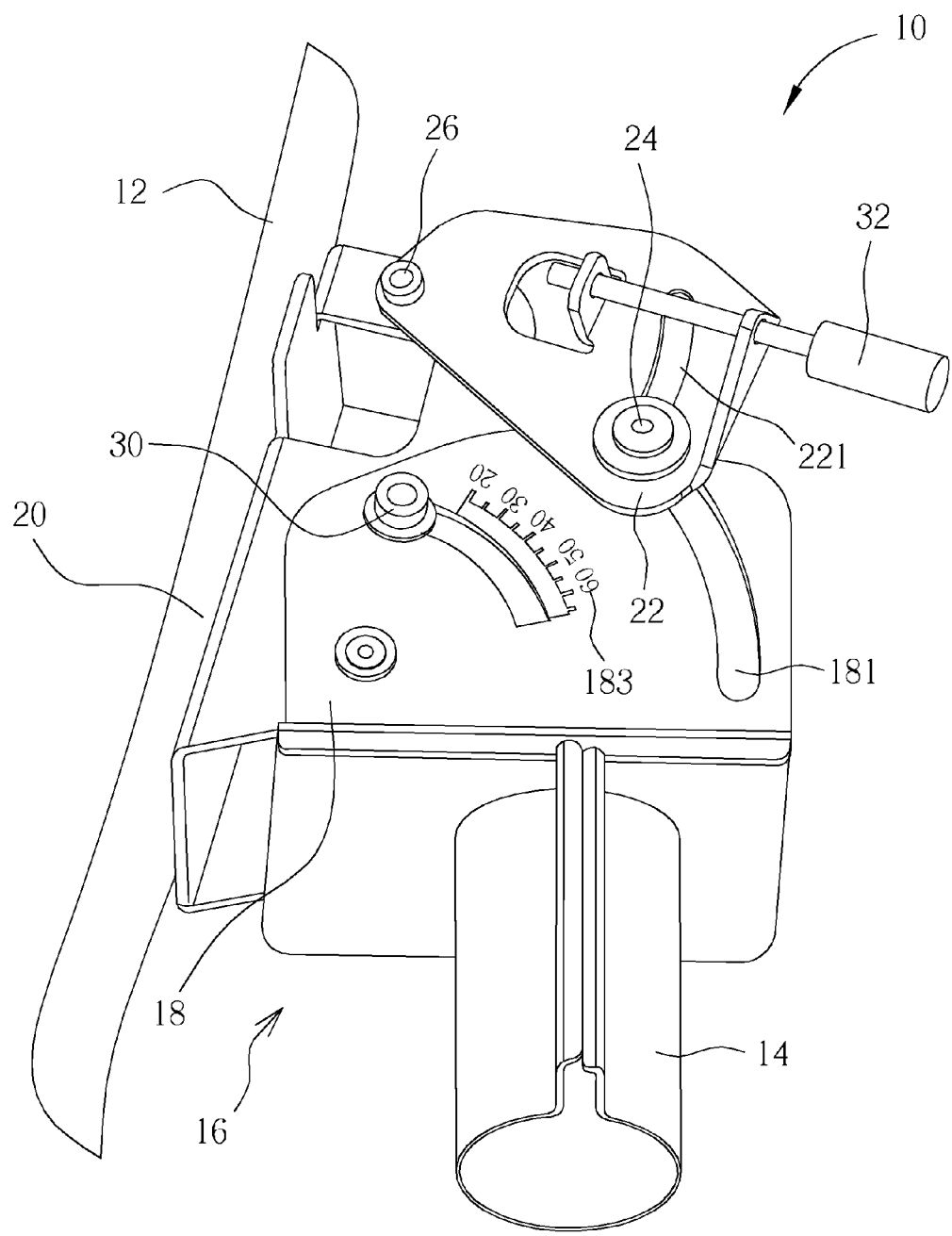

Please refer to FIG. 6 and FIG. 7. FIG. 6 and FIG. 7 are diagrams of the antenna system 10 in different modes according to the first embodiment of the present invention. As shown in FIG. 6, when the jointing component 24 slides to the end (the right end) of the first slot 221, the distance L1 between the rotary set 26 and the end of the first slot 221 is smaller than the distance between the rotary set 26 and the other section of the first slot 221. Meanwhile, the supporter 20 pivots relative to the base 18 at a low position of the micro-scale adjustment of the antenna system 10, which means that the antenna module 12 is located at the greatest elevation angle. On the other hand, when the jointing component 24 slides from the end (the right end) to the other end (the left end) of the first slot 221, as shown in FIG. 7, the supporter 20 can pivot relative to the base 18 at a position having minimize elevation angle because the distance L2 between the rotary set 26 and the jointing component 24 is greater than the distance between the rotary set 26 and the other section of the first slot 221. Final, the supporter 20 can be prevented from pivoting relative to the base 18 by the fixing component 30 after the macro-scale adjustment (a slide of the jointing component 24 relative to the second slot 181 on the base 18) and the micro-scale adjustment (a slide of the connecting component 22 relative to the jointing component 24 via the first slot 221) are executed, so that the antenna module 12 can be fixed at a predetermined elevation position relative to the tube 14.

Figure 8:
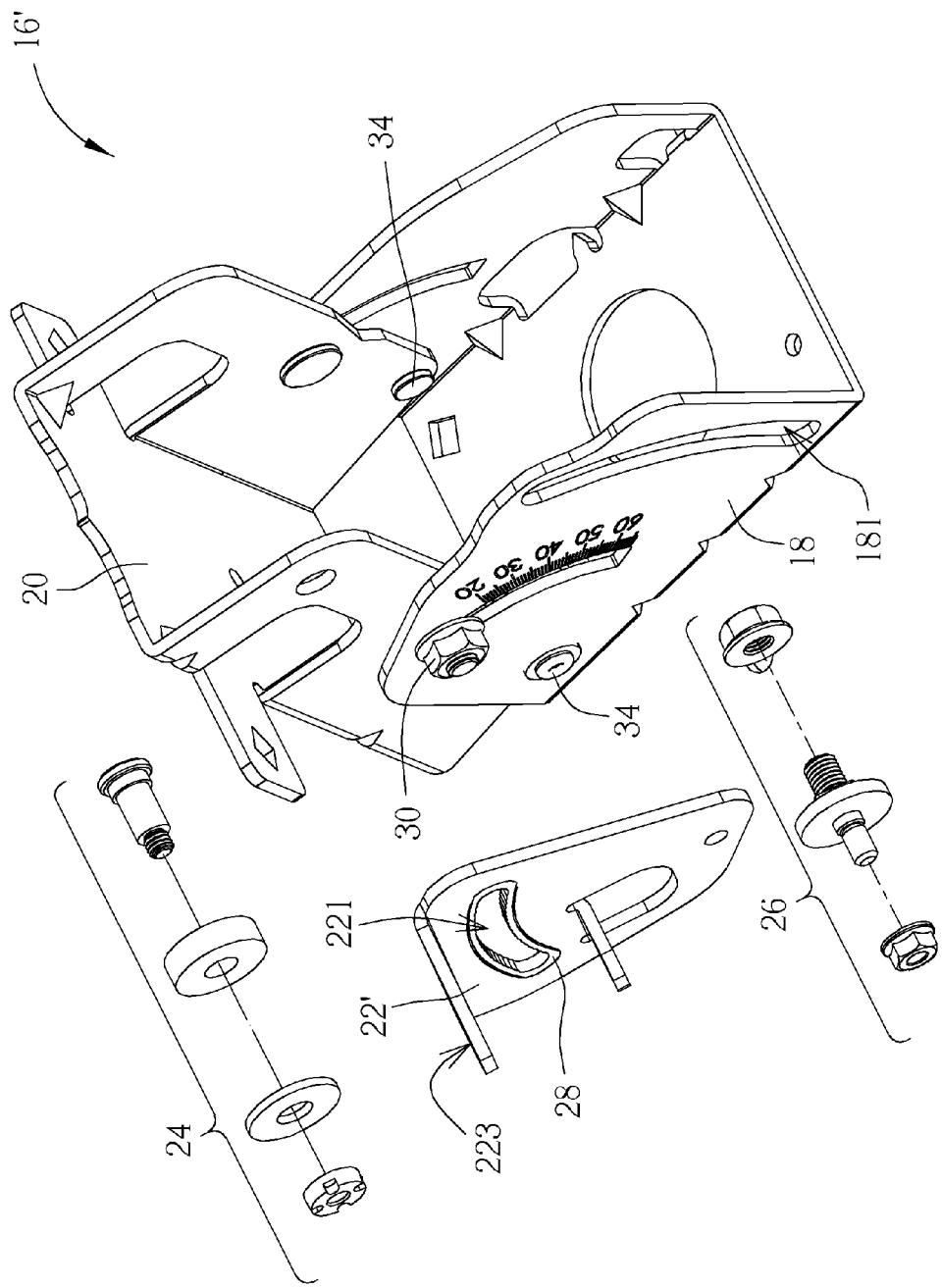
FIG. 8 is an exploded diagram of the adjusting mechanism according to a second embodiment of the present invention.
Figure 9:
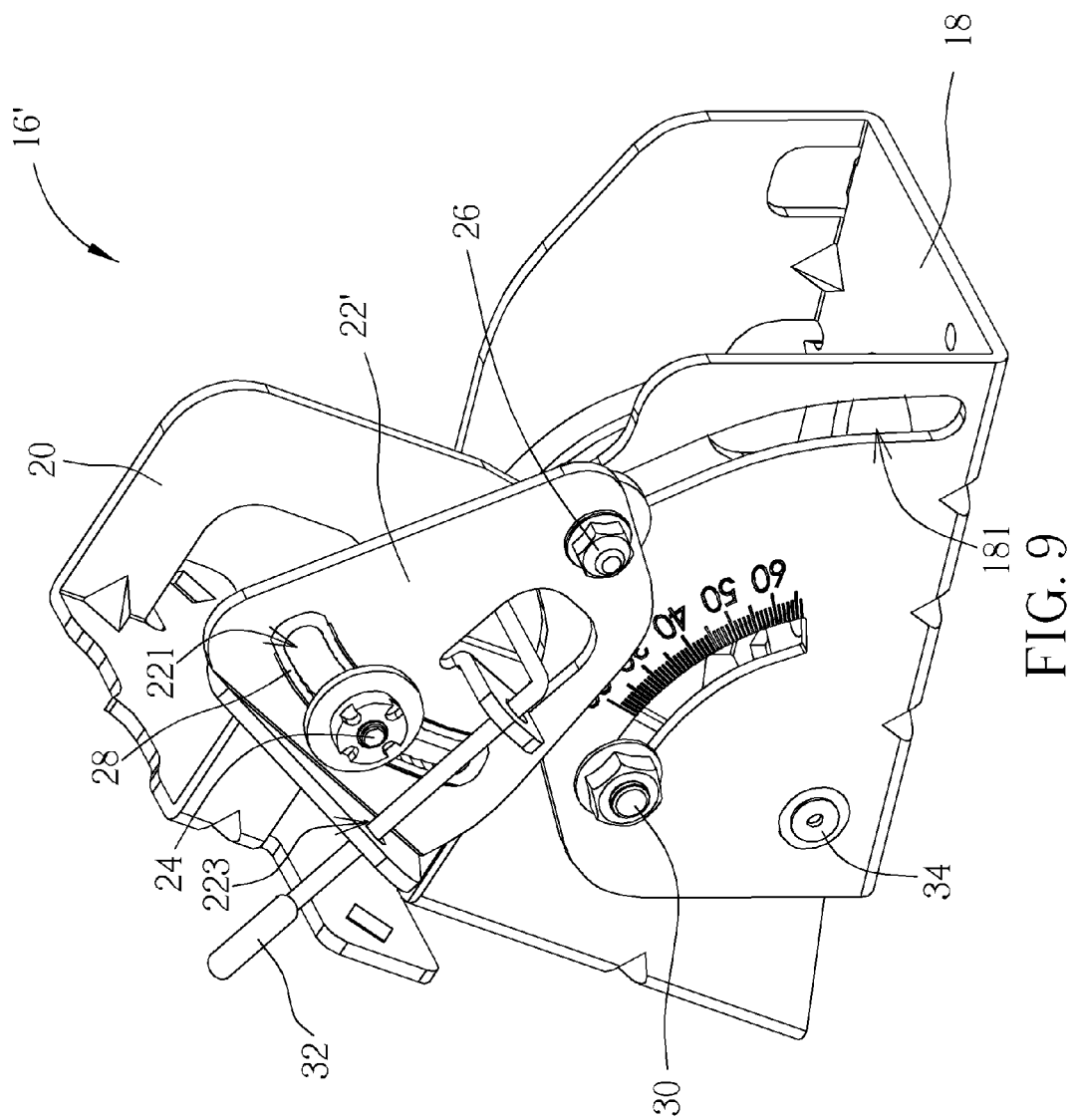
FIG. 9 is an assembly diagram of the adjusting mechanism according to the second embodiment of the present invention.

Please refer to FIG. 8 and FIG. 9. FIG. 8 is an exploded diagram of an adjusting mechanism 16' according to a second embodiment of the present invention. FIG. 9 is an assembly diagram of the adjusting mechanism 16' according to the second embodiment of the present invention. In the second embodiment, elements having the same numeral as ones of the first embodiment have the same structures and functions, and a detailed description is omitted herein for simplicity. The adjusting mechanism 16' includes the base 18 whereon the slide slot 181 (the foresaid second slot) is formed, the supporter 20, the connecting component 22' whereon the curved slot 221 (the foresaid first slot) is formed, the jointing component 24 and the rotary set 26. The supporter 20 is pivotally connected to the base via shafts 34. The rotary set 26 is disposed on the connecting component 22' and movably inserts into the slide slot 181 to rotatably and slidably dispose the connecting component 22' on the base 18. The jointing component 24 is disposed on the supporter 20 and slidably inserts to the curved slot 221.

The rotary set 26 can slide relative to the base 18 along the direction of the slide slot 181 to simultaneously move the connecting component 22' relative to the base 18, so as to rotate the supporter 20 relative to the base 18 (via the shafts 34) for the macro-scale adjustment. Further, the connecting component 22' can rotate relative to the base 18 by the rotary set 26 and simultaneously slide relative to the supporter 20 via the jointing component 24 along the direction of the curved slot 221, so as to rotate the supporter 20 relative to the base 18 (via the shafts 34) for the micro-scale adjustment. The connecting component 22' in the second embodiment is the inverse disposal of the connecting component 22 in the first embodiment. The contacting component 32 is disposed on the opening 223 on the connecting component 22' to be a point of application. An external force can be applied to the contacting component 32 to move the connecting component 22' relative to the base 18 along the slide slot 181 and/or to slide the connecting component 22' relative to the jointing component 24 along the curved slot 221 (in the meanwhile, the connecting component 22' is rotated via the rotary set 26). Therefore, the elevation angle and the azimuth angle of the antenna module 12 can be adjusted.

In addition, the constraining component 28 can be disposed inside the curved slot 221 on the connecting component 22'. Application of the constraining component 28 is the same as ones of the first embodiment, which depends on actual demand. The constraining component 28 buckles apart of the jointing component 24 to constrain movement of the jointing component 24 relative to the curved slot 221. The fixing component 30 is disposed on the supporter 20 and movably pierces through the dial scale 183 of the base 18. Assembly of the fixing component 30 and the dial scale 183 can indicate angle variation since the supporter 20 rotates relative to the base 18. Pivot between the supporter 20 and the base 18 can be locked by the fixing component 30 after the macro-scale/micro-scale adjustment is finished.

Figure 10:
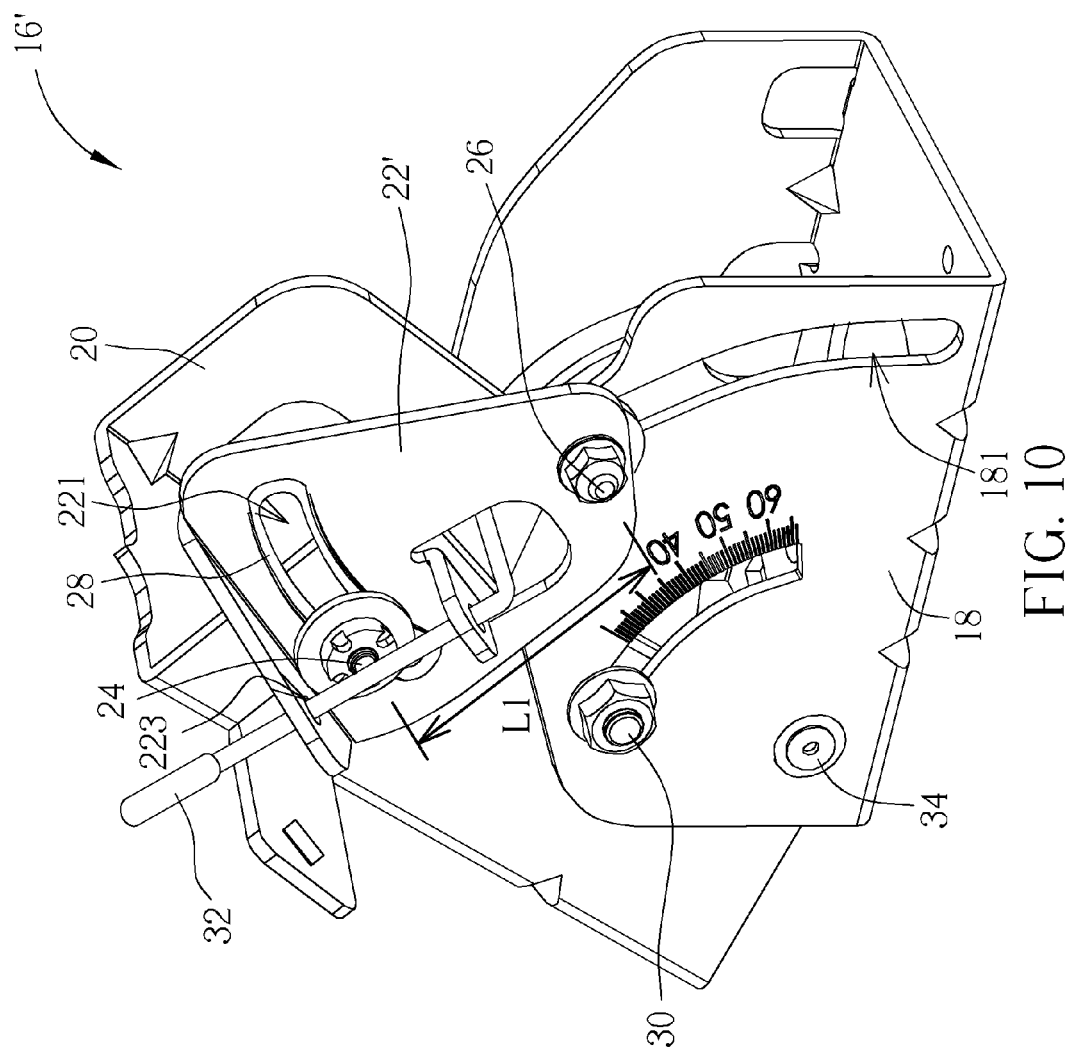
FIG. 10 and FIG. 11 respectively are diagrams of the adjusting mechanism in different modes according to the second embodiment of the present invention.
Figure 11:
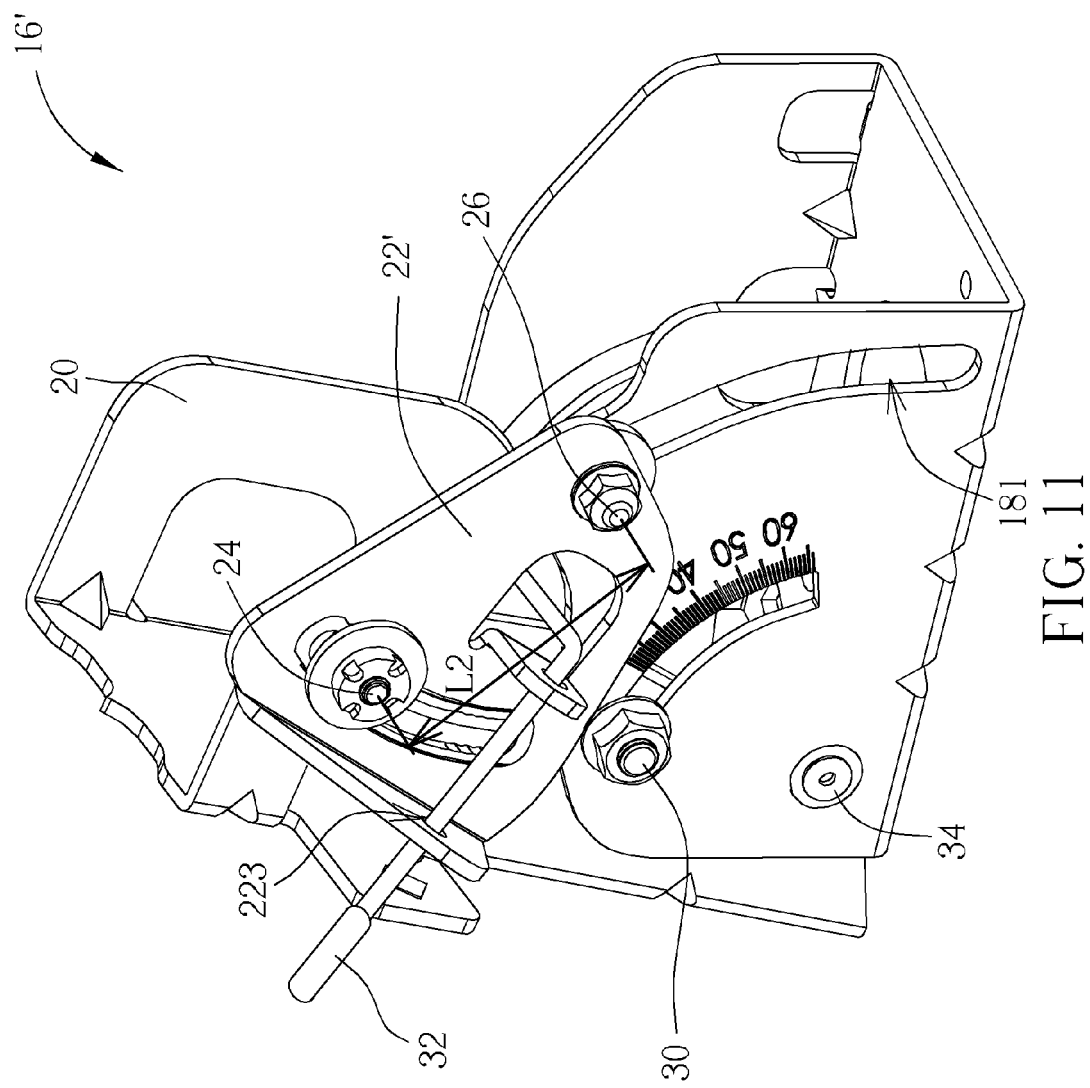

Please refer to FIG. 10 and FIG. 11. FIG. 10 and FIG. 11 respectively are diagrams of the adjusting mechanism 16' in different modes according to the second embodiment of the present invention. The distance L1 between the rotary set 26 and an end of the curved slot 221 is smaller than the distance L2 between the rotary set 26 and the other end of the curved slot 221. The distance between the rotary set 26 and any section between two ends of the curved slot 221 is different from the distance between the rotary set 26 and another section of the curved slot 221. The curved slot 221 is an arc slot with linear curvature variation, so that the supporter 20 is driven to upwardly or downwardly rotate since the connecting component 22' slides relative to the jointing component 24 along the curved slot 221. For example, an angle of the supporter 20 relative to the base 18 shown in FIG. 10 is smaller than an angle of the supporter 20 relative to the base 18 shown in FIG. 11. An angle of the supporter 20 relative to the base 18 shown in FIG. 9 is preferably located between the angle shown in FIG. 10 and FIG. 11.

Comparing to the prior art, the antenna system of the present invention can utilize the adjusting mechanism to execute angle adjustment of the antenna module relative to the tube, such as the elevation angle or the azimuth angle, and it depends on position of the adjusting mechanism. The adjusting mechanism of the present invention can adjust the angle of the supporter relative to the base by sliding the connecting component relative to the jointing component. Because the first slot on the connecting component can be the linear arc slot, pivot of the supporter relative to the base can be the linear rotation, so that the elevation angle (or the azimuth angle) of the antenna module can be adjusted accurately. In addition, the adjusting mechanism of the present invention has advantages of simple structure, easy operation and low transportation cost.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An adjusting mechanism comprising:
a base whereon a slide slot is formed;
a supporter pivotally connected to the base via a shaft;
a connecting component rotatably and slidably disposed on the slide slot on the base, a curved slot being formed on the connecting component; and
a jointing component disposed on the supporter and slidably inserting to the curved slot on the connecting component, the connecting component sliding relative to the supporter via the jointing component along a direction of the curved slot to simultaneously rotate the supporter relative to the base.

2. The adjusting mechanism of claim 1, wherein the adjusting mechanism further comprises a rotary set disposed on the connecting component and slidably inserting to the slide slot on the base, the connecting component rotates relative to the base via the rotary set and slides relative to the base by movement of the rotary set along a direction of the slide slot, a distance is formed between the rotary set and each section of the curved slot.

3. The adjusting mechanism of claim 2, wherein a distance between the rotary set and an end of the curved slot is smaller than a distance between the rotary set and the other end of the curved slot, and the curved slot is an arc slot.

4. The adjusting mechanism of claim 3, wherein a distance between the rotary set and a section between two ends of the curved slot is different from a distance between the rotary set and another section of the curved slot.

5. The adjusting mechanism of claim 1, further comprising:
a constraining component disposed inside the curved slot on the connecting component to constrain movement of the jointing component relative to the curved slot.

6. The adjusting mechanism of claim 1, further comprising:
a fixing component piercing through the base and the supporter to prevent the supporter and the base from pivot.

7. The adjusting mechanism of claim 1, further comprising:
a contacting component detachably disposed inside an opening on the connecting component to rotate the connecting component relative to the base and to simultaneously slide the connecting component relative to the jointing component along the direction of the curved slot.

8. An antenna system comprising:
an antenna module;
a tube; and
an adjusting mechanism disposed between the antenna module and the tube, the adjusting mechanism comprising:
a base whereon a slide slot is formed;
a supporter pivotally connected to the base via a shaft;
a connecting component rotatably and slidably disposed on the slide slot on the base, a curved slot being formed on the connecting component; and
a jointing component disposed on the supporter and slidably inserting to the curved slot on the connecting component, the connecting component sliding relative to the supporter via the jointing component along a direction of the curved slot to simultaneously rotate the supporter relative to the base.

9. The antenna system of claim 8, wherein the adjusting mechanism further comprises a rotary set disposed on the connecting component and slidably inserting to the slide slot on the base, the connecting component rotates relative to the base via the rotary set and slides relative to the base by movement of the rotary set along a direction of the slide slot, a distance is formed between the rotary set and each section of the curved slot.

10. The antenna system of claim 9, wherein a distance between the rotary set and an end of the curved slot is smaller than a distance between the rotary set and the other end of the curved slot, and the curved slot is an arc slot.

11. The antenna system of claim 10, wherein a distance between the rotary set and a section between two ends of the curved slot is different from a distance between the rotary set and another section of the curved slot.

12. The antenna system of claim 8, wherein the adjusting mechanism further comprises a constraining component disposed inside the curved slot on the connecting component to constrain movement of the jointing component relative to the curved slot.

13. The antenna system of claim 8, wherein the adjusting mechanism further comprises a fixing component piercing through the base and the supporter to prevent the supporter and the base from pivot.

14. The antenna system of claim 8, wherein the adjusting mechanism further comprises a contacting component detachably disposed inside an opening on the connecting component to rotate the connecting component relative to the base and to simultaneously slide the connecting component relative to the jointing component along the direction of the curved slot.

* * * * *